Jan. 26, 1932.   R. O. HENDRICKSON   1,842,752
TRACTOR
Filed Dec. 30, 1929   2 Sheets-Sheet 1

Inventor
ROBERT O. HENDRICKSON,

By James A. Walsh

Attorney

Jan. 26, 1932.        R. O. HENDRICKSON        1,842,752
TRACTOR
Filed Dec. 30, 1929        2 Sheets-Sheet 2
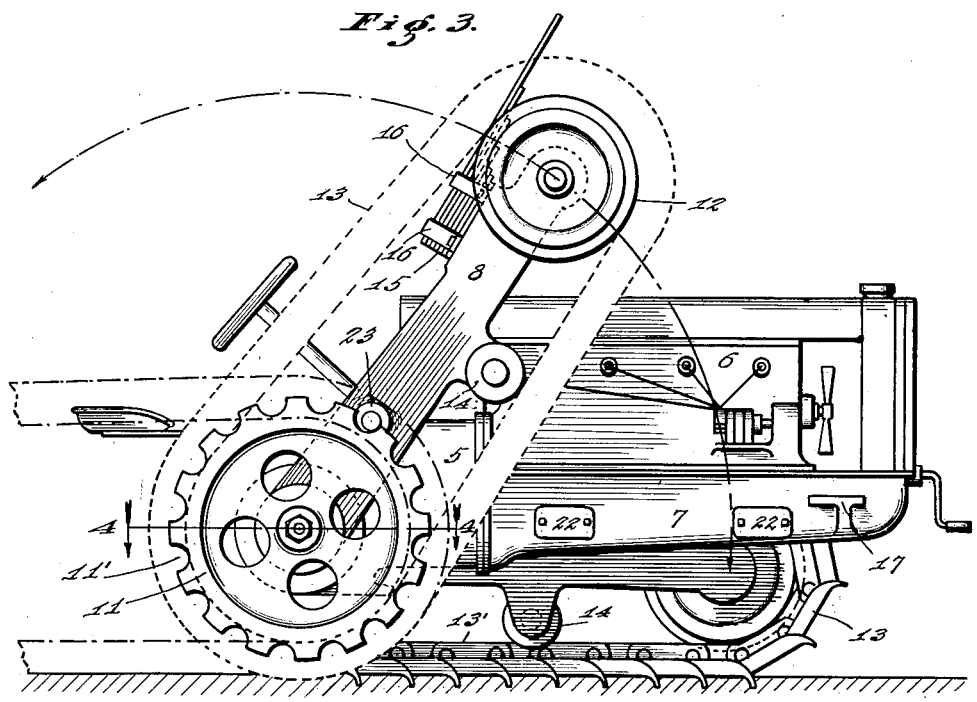
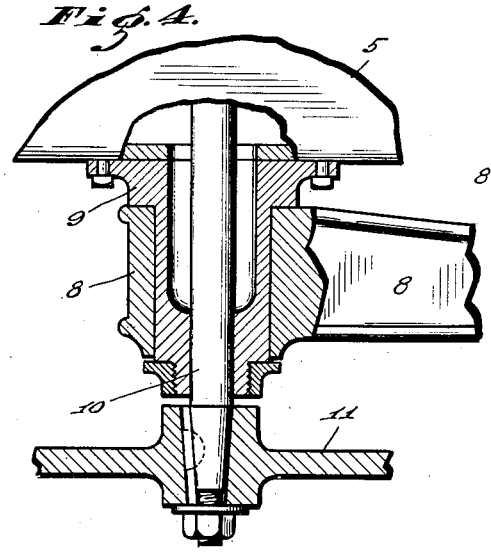
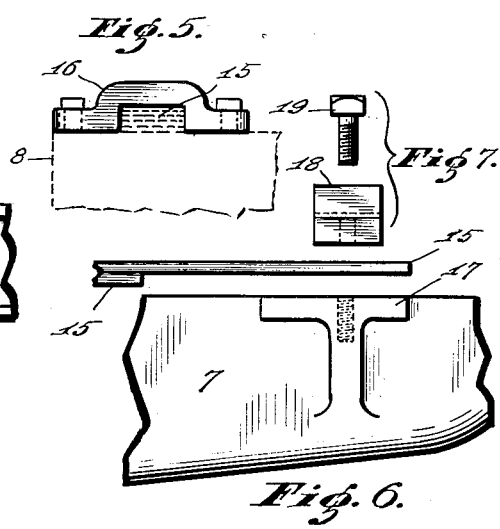
Inventor
ROBERT O. HENDRICKSON,
By        James A. Walsh
Attorney Patented Jan. 26, 1932

1,842,752

UNITED STATES PATENT OFFICE

ROBERT O. HENDRICKSON, OF RACINE, WISCONSIN, ASSIGNOR TO J. I. CASE COMPANY, OF RACINE, WISCONSIN, A CORPORATION

TRACTOR

Application filed December 30, 1929. Serial No. 417,419.

Tractors of the crawler type as at present constructed are exceedingly heavy and unwieldy, and the parts thereof are so closely and intricately assembled that it is difficult and sometimes impossible to repair certain parts of the traction frames and engine or obtain access to the interior of the latter without removing such parts from the body, for which reason repair and replacement are quite slow and tedious and accomplished only at material expense of time and labor. The object of my present invention is to provide a crawler tractor in which the traction frames are adjustably connected to the tractor in such manner that ready access may be had to the interior of the body and to the engine and other working parts without removing the latter, as is common, and also whereby the traction frames may be rotated into convenient positions to be inspected, repaired and otherwise attended to without removal, as will hereinafter more fully appear.

Figure 1:
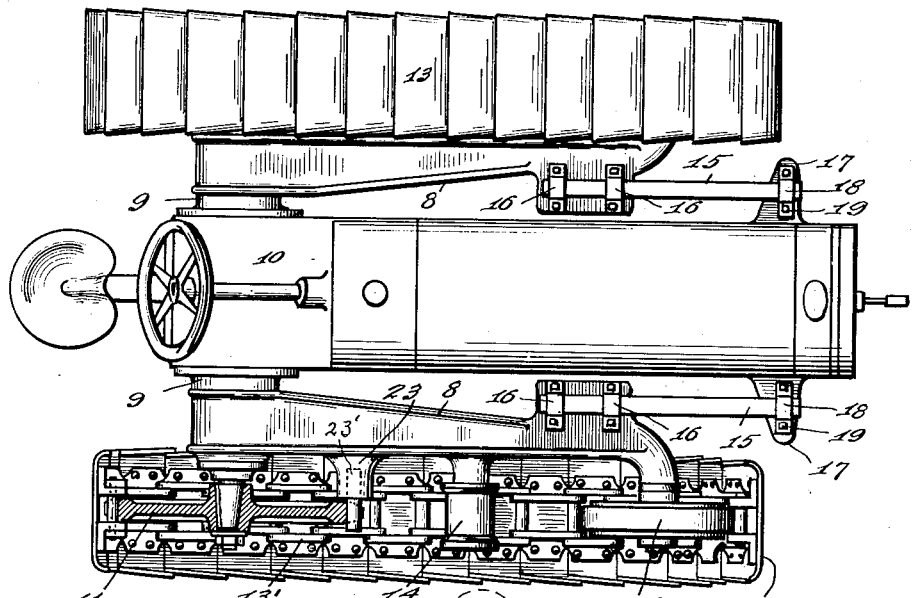
Figure 2:
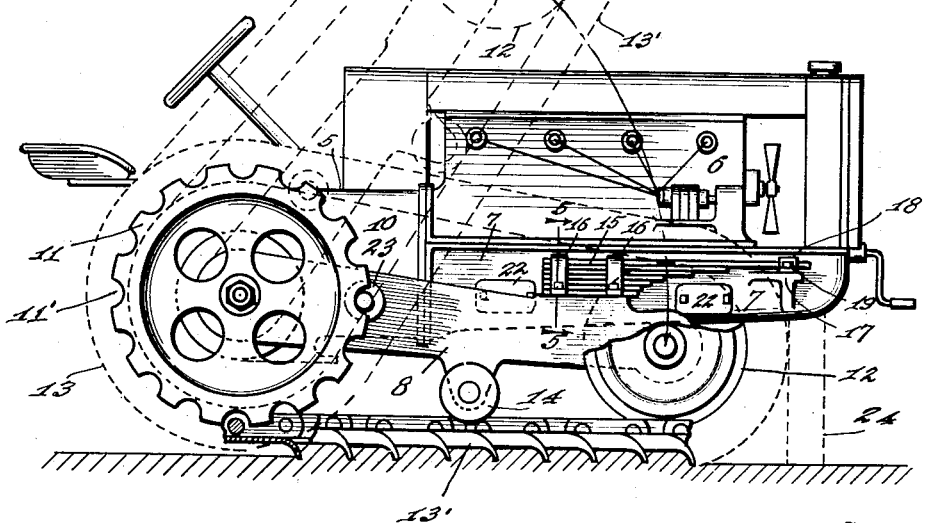

In the accompanying drawings, forming part hereof, Figure 1 is a plan view of a tractor embodying my improvements; Fig. 2, a side elevation showing the traction frames in inclined position as indicated by dotted lines; Fig. 3, a side elevation showing the near traction frame adjusted to inclined position; Fig. 4, a detail section on an enlarged scale taken on the dotted line 4—4 in Fig. 3; Fig. 5, a front view of a clip for securing the end of a leaf spring to the tractor body, taken on the dotted line 5—5 in Fig. 2; Fig. 6, a fragmentary detail showing a lug to which the forward end of the spring is connected; and Fig. 7 is a disassembled view of a keeper and screw-bolt for fastening the spring to said lug.

In the drawings the numeral 5 indicates the body of the tractor, to which the engine-block 6 and crank-case 7 are connected, as usual, which parts may be of any desired construction. At each side of the body 5 a traction frame 8 is pivotally mounted on the housings 9 of the axle sections 10, which sections support driving sprockets 11 connected to idler wheels 12 by traction chains or belts 13 of any desired construction, the lower runs 13' of the chains engaging one or more guide rollers 14 in a well known manner. Upon the rotatable frame members 8 a leaf-spring 15 is secured by clips 16 bolted to the frame, as clearly indicated in Figs. 2 and 5, and which springs are extended to the forward end of the body and detachably secured thereto in any desired manner, the means shown for illustration being a lug 17, which may be integrally formed with the body, and to which the end of the spring is secured by a keeper 18 and bolt 19 as indicated in Figs. 6 and 7, by which method the forward ends of the frames through their connection with the springs 15 are also secured in a manner to prevent lateral play of these parts.

When assembled as described, it will be understood that the body of the tractor and the traction frames are securely connected and in condition to traverse the land and roads in the usual manner. However, it is frequently necessary to inspect and adjust the engine, as for example to tighten connecting-rods and otherwise, which is accomplished through openings in the crank-case by removing the cover plates 22 therefrom, which access to the interior of the body, as hereinbefore explained, is exceedingly difficult with tractors as ordinarily built, and it also becomes necessary to repair the belts or chain drives, in many instances requiring the complete removal and reassemblage thereof with the parts associated therewith. To simplify this work I detach the forward end of the spring 15 from lug 17, and by applying the power of the tractor in the usual way the chain through its connection with the sprocket 11 will be actuated to rotate the traction frame rearwardly and clear from the tractor body, so that there will be no obstruction in the way of the operator or interference when removing the cover plates 22 for access to the interior of the body, as clearly indicated in Fig. 3. When the frame has been adjusted to the desired range it can be so maintained by chocking the drive sprocket 11 with a tool which may be inserted into one of the notches 11' of the sprocket in a manner to be engaged with the traction frame or otherwise, or a run of the chain may be tied to the frame member to prevent the chain from traveling, and the traction frame thus held in fixed elevated position, but as a simple means for the purpose I prefer to provide a boss 23 on the frame member having an opening therein which registers with a notch 11' in the sprocket and by inserting a pin 23' or other device through a notch and into the opening in the boss the frame will be locked in the desired position as indicated in Figs. 1 and 3, although where practical brakes used in connection with the sprockets may be utilized for holding the frames in the positions to which they have been rotated. As indicated by the dotted line arrows in said Fig. 3, the traction frame may be rotated until its upper side lies on the ground behind the tractor, which is of great advantage and importance in that convenient and ready access to the upper and lower runs of the chain is provided for replacing links and other parts of the traction frame without the necessity of removing the assembly; and it will be understood that when the tractor is elevated to a sufficient height the frames may be given a complete revolution if desired. When one of the traction frames has been thus raised the tractor will be supported in normal position by the opposite frame and the sprocket of the adjusted frame. It will be further understood that when it is desired to return the adjusted frame to the position indicated by full lines in Fig. 2 it is but necessary to remove the chock from the sprocket and reverse the power of the engine whereupon the frame will be rotated to normal position and secured by the keeper 18 or in other suitable manner. In circumstances where it is necessary to adjust both traction frames a suitable support, indicated by dotted lines 24, Fig. 2, may be placed under the forward portion of the tractor body, and by manipulating the traction frames as hereinbefore described the frames on each side may be rotated to positions such as indicated by the dotted lines in Fig. 2, so that the parts at both sides of the tractor may be inspected, adjusted or repaired at the same time. While I prefer to utilize the power of the tractor for adjusting the traction assemblies as described, the same result can be readily accomplished with the aid of jacks and the like in connection with suitable props or braces for maintaining the frames in raised position.

The front wheels, as shown, are supported in the traction frames in alinement with the drive sprockets so that the traction belts will be properly guided, and through the springs 15 it is obvious that a high degree of resiliency is obtained in a vertical direction, and also that the belts may follow the contour of the ground independently of each other without in any manner imparting strain to the tractor body. As stated, the rear ends of the springs are secured to the frames and their forward ends to the tractor body in a manner to obviate lateral movement of the frames, as the springs are prevented from creeping closer to or away from the body, thus maintaining the frames in perfect parallel relation to the sides of the tractor body at all times, and it will be apparent that any strains which might be imposed upon the forward ends of the frames, when the tractor is being turned or where a belt strikes an obstruction, will be transmitted to the tractor body through the springs 15.

I claim as my invention:

1. In a tractor embodying a housing, a traction frame pivotally mounted on the housing including sprocket-and-chain driving means, means for rotating the frame about said pivotal mounting to predetermined positions, and means adapted to engage said frame and sprocket for retaining the frame in such positions.

2. The combination, with a tractor, of a traction frame pivotally connected at one of its ends to the tractor and rotatable forwardly and rearwardly in relation thereto, a leaf spring in parallel relation with and connected to the frame, and means on the tractor body connecting the spring to the tractor whereby yielding movements are imparted to the frame.

3. In a tractor, a traction frame embodying a sprocket and idler wheels and an endless chain connecting said wheels, means for rotatably connecting the frame to the tractor, and means on the frame adapted to be locked with said sprocket to maintain the frame in predetermined positions.

4. The combination, with a tractor body, of a traction frame normally positioned in parallel relation thereto, means for rotatably connecting one end of the frame to the tractor, means for detachably securing the forward end of the frame to the tractor, means for rotating the frame upwardly in relation to the body whereby unobstructed access can be had to the body, and means engaging the frame in the position to which it has been rotated and maintaining said frame.

5. The combination, with a tractor, of a traction frame pivotally connected at its rear end to the tractor and rotatable upwardly and downwardly in relation thereto, a spring extending forwardly in the longitudinal direction of the frame, means connecting the forward end of the spring to the tractor whereby the frame may be moved vertically when said connecting means are disengaged, and means for sustaining the frame in vertical position.

6. In a tractor embodying a housing, a traction frame having one of its ends pivotally mounted on the housing, means for rotating the frame about its pivotal mounting in upward and downward relation to the tractor, and means associated with the frame for maintaining the latter in predetermined positions when rotated from normal parallel relation to the tractor.

7. The combination, with a tractor having a driving axle, of a traction frame pivotally mounted at one of its ends on the axle, said frame including a sprocket, means embodied in the tractor for rotating the frame to extend upwardly and rearwardly from its pivotal point and downwardly and forwardly in relation to the tractor, and means for securing the sprocketed frame to maintain the latter in predetermined positions.

8. The combination, with a tractor having a driving axle, of a traction frame pivotally mounted at one of its ends on the axle and including a sprocket, means embodied in the tractor for rotating the frame to extend upwardly and rearwardly from its pivotal point and downwardly and forwardly therefrom in relation to the tractor, means for normally securing the forward end of the frame to the tractor, and means for maintaining the frame in predetermined position when rotated.

In testimony whereof I affix my signature.

ROBERT O. HENDRICKSON.